(12) United States Patent
Gove, Jr.

(10) Patent No.: US 11,195,312 B1
(45) Date of Patent: Dec. 7, 2021

(54) GRAGNOSTICS RENDERING

(71) Applicant: Two Six Labs, LLC, Arlington, VA (US)

(72) Inventor: Robert P. Gove, Jr., Reston, VA (US)

(73) Assignee: Two Six Labs, LLC, Arlington, VA (US)

( * ) Notice: Subject to any disclaimer, the term of this patent is extended or adjusted under 35 U.S.C. 154(b) by 0 days.

(21) Appl. No.: 16/865,946

(22) Filed: May 4, 2020

Related U.S. Application Data

(63) Continuation of application No. 15/935,657, filed on Mar. 26, 2018, now Pat. No. 10,657,686.

(51) Int. Cl.
| | |
|---|---|
| *G06T 11/20* | (2006.01) |
| *G06F 16/28* | (2019.01) |
| *G06F 16/35* | (2019.01) |
| *G06F 16/904* | (2019.01) |
| *G06F 40/30* | (2020.01) |
| *H04L 12/26* | (2006.01) |

(52) U.S. Cl.
CPC .......... *G06T 11/206* (2013.01); *G06F 16/287* (2019.01); *G06F 16/358* (2019.01); *G06F 40/30* (2020.01); *H04L 43/045* (2013.01)

(58) Field of Classification Search
CPC ...... G06F 16/287; G06F 16/358; G06F 40/30; G06T 11/206; H04L 43/045
See application file for complete search history.

(56) References Cited

U.S. PATENT DOCUMENTS 10,657,686 B2* 5/2020 Gove, Jr. .............. G06T 11/206

OTHER PUBLICATIONS

M. Vazirgiannis, "Graph Similarity and Classification @ DaSciM", Feb. 11, 2018, pp. 1-90 (Year: 2018).*
N. Shervashidze, "Weisfeiler-Lehman Graph Kernels", Journal of Machine Learning Research 12 (2011) pp. 2539-2561 (Year: 2011).*
Q. Liao, A. Striegel, and N. Chawla, "Visualizing Graph Dynamics and Similarity for Enterprise Network Security and Management," Proc. Seventh Int'l Symp. Visualization for Cyber Security (VizSec '10), pp. 34-45, 2010 (Year: 2010).*

(Continued)

*Primary Examiner* — Jin Cheng Wang
(74) *Attorney, Agent, or Firm* — Armis IP Law, LLC

(57) ABSTRACT

A graph processing system, method and apparatus classifies graphs based on a linearly computable set of features defined as a feature vector adapted for comparison with the feature vectors of other graphs. The features result from graph statistics ("gragnostics") computable from the edges and vertices of a set of graphs. Graphs are classified based on a multidimensional distance of the resulting feature vectors, and similar graphs are classified according to a distance, or nearest neighbor, of the feature vector corresponding to each graph. Projection of the feature vector onto two dimensions allows visualization of the classification, as similar graphs appear as clusters or groups separated by a relatively shorter distance. Different types or classifications of graphs also appear as other, more distant, clusters. An initial training set defines the classification types, and sampled graphs are evaluated and classified based on the feature vector and nearest neighbors in the training set.

10 Claims, 10 Drawing Sheets
(5 of 10 Drawing Sheet(s) Filed in Color)

(56) References Cited

OTHER PUBLICATIONS

N. Cao, et al., "g-Miner: Interactive Visual Group Mining on Multivariate Graphs", http://team-net-work.org/pdfs/CaoLLT_CHI15.pdf, Chi 2015, Apr. 18-23, 2015, Seoul, Korea, pp. 1-10 (Year: 2015).*

Kaspar Riesen, et al., "Graph Classification and Clustering based on Vector Space Embedding", Series in Machine Perception and Artificial Intelligence, vol. 77, 2010 by World Scientific Publishing Col., pp. 1-331 (Year: 2010).*

Kantarci, et al., "Classification of Complex Networks Based on Topological Properties", Cloud and Green Computing (CGC), 2013 Third International Conference, IEEE Xplore Digital Library, Sep.-Oct. 2013, pp. 1-9 (Year: 2013).*

Li, et al., "Effective Graph Classification Based on Topological and Label Attributes", 2012 Wiley Periodicals, Inc., pp. 265-283, Apr. 25, 2012, Published on Jun. 12, 2012 in Wiley Online Library (Year: 2012).*

Y. Keselman, "Many-to-Many Graph Matching via Metric Embedding", retrieved from, http://www.cs.toronto.edu/~sven/Papers/cvpr2003.pdf, 2003, pp. 1-8 (Year: 2003).*

\* cited by examiner

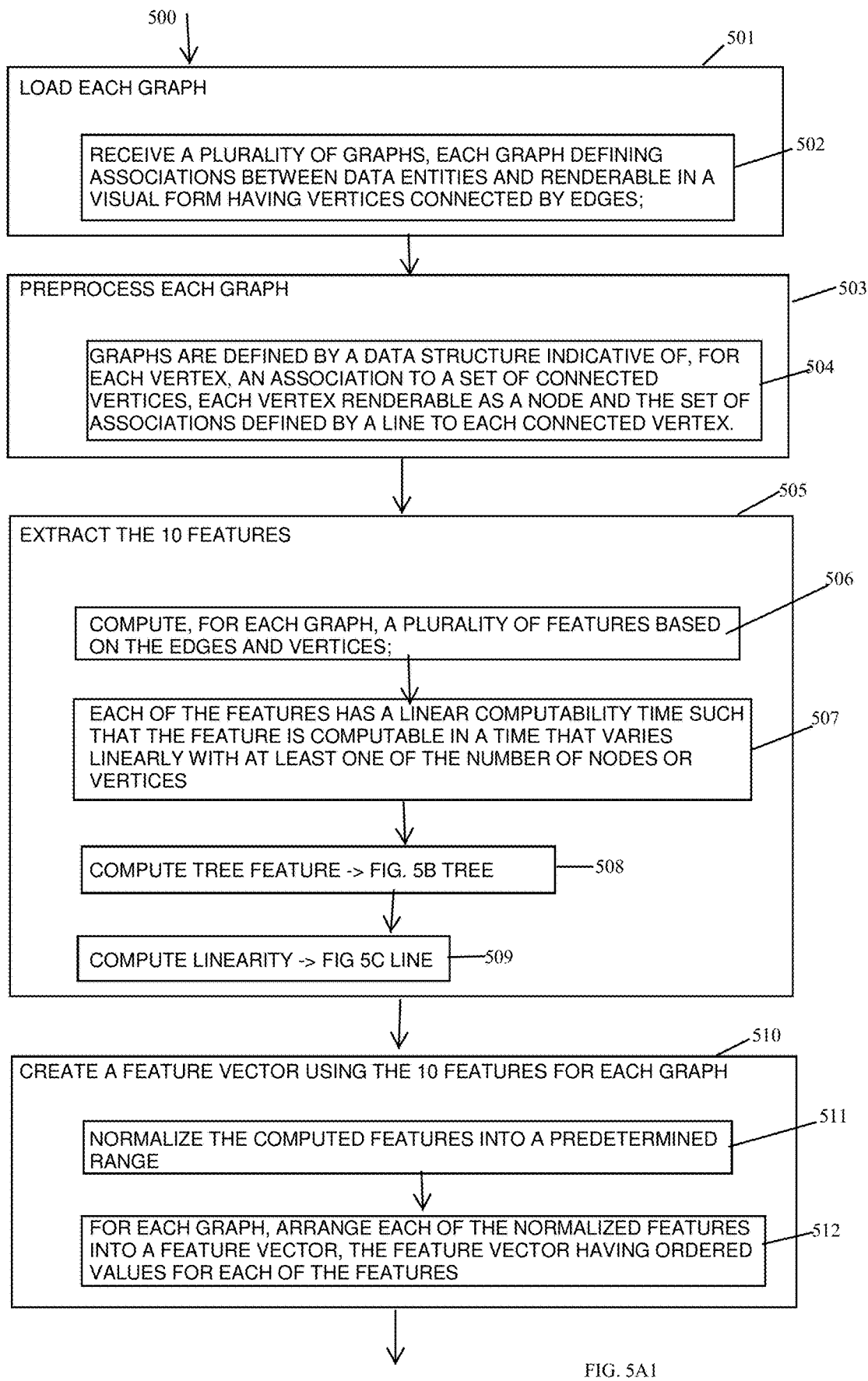
FIG. 5A1

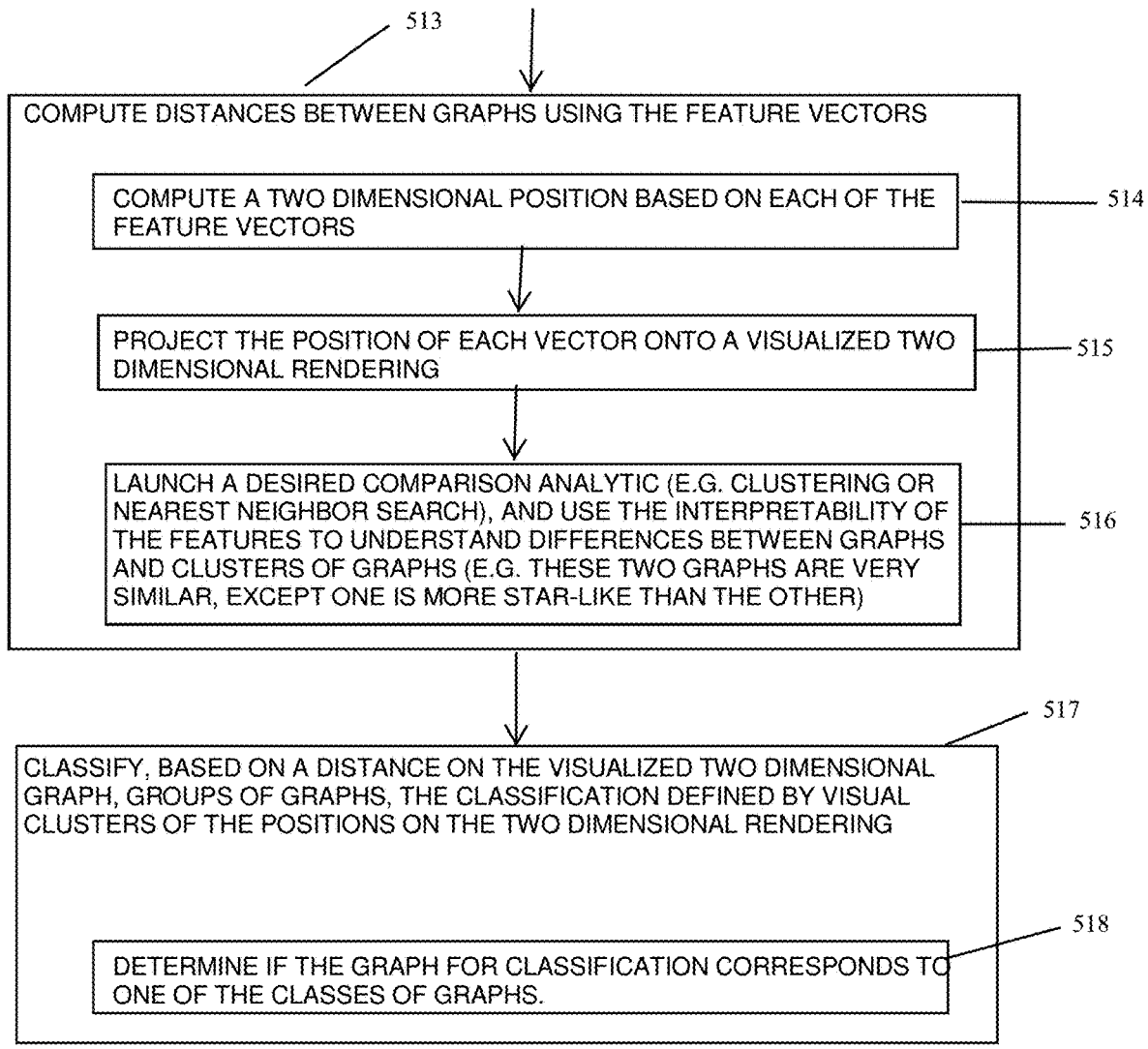
FIG. 5A2

GRAGNOSTICS RENDERING

RELATED APPLICATIONS

This application is a continuation of earlier filed U.S. patent application Ser. No. 15/935,657 entitled "GRAGNOSTIC RENDERING," filed on Mar. 26, 2018, the entire teachings of which are incorporated herein by this reference.

BACKGROUND

Graphs are often employed for representing associations or relations between entities. Graphs include a set of nodes, or vertices connected by edges, or lines. Mathematical and computational representations defined by various expressions and data structures are often used in practice, however graphs can also be visually expressed to facilitate human recognition of the information or trends contained therein. Visual recognition of trends can often be made by observing "clusters" of nodes, meaning a set of nodes that share similar attributes, features or values, and the corresponding computational representation is available for automated processing or interpretation of the graph in areas such as machine learning, analytics, and statistics.

SUMMARY

A graph processing system, method and apparatus classifies graphs based on a linearly computable set of features defined as a feature vector adapted for comparison with the feature vectors of other graphs. The features result from graph statistics ("gragnostics") computable from the edges and vertices of a set of graphs. Graphs are classified based on a multidimensional distance of the resulting feature vectors, and similar graphs are denoted according to a distance, or nearest neighbor, of the feature vector corresponding to each graph. Projection of the feature vector onto a two dimensional Cartesian plane allows visualization of the classification, as similar graphs appear as clusters or groups separated by a relatively shorter distance. Different types or classifications of graphs also appear as other, more distant, clusters. An initial training set defines the classification types, and sampled graphs are evaluated and classified based on the feature vector and nearest neighbors in the training set.

Configurations herein are based, in part, on the observation that graphs are often employed for storing information that can also be rendered or visualized to facilitate human recognition of the information contained in the graph. Unfortunately, conventional approaches to graph processing and rendering suffers from the shortcoming that large graphs can be unwieldy in both processing and recognition. Existing approaches to comparing graphs are slow and not very expressive in explaining how the graphs are similar or dissimilar. Large graphs, such as those that may be derived from analytics-focused data sources, can result in a number of nodes and vertices that are cumbersome to process, and difficult to visually recognize or interpret, due to scaling or geometric issues, e.g. a large number of nodes or vertices merge into an amorphous visual image. Accordingly, configurations herein substantially overcome the above-described shortcomings by providing a linearly computable feature vector based on quantifiable features of a graph, and a comparison metric that determines a classification of a graph to designate graphs sharing similar features, and hence, likely depict related information types or forms. In other words, classification of a graph results from comparison of other graphs to answer questions such as "Which graphs or graph types does my graph most resemble?" Depending on the data source used to define the graphs, correlations between the data sources may be inferred.

Configurations disclosed herein are operable for, in an analytics environment having graph data responsive to rendering for visual recognition, comparison of statistical trends defined in a plurality of graphs. The disclosed scalable method of rendering visualized graph data includes receiving a plurality of graphs, such that each graph defines associations between data entities and is renderable in a visual form having vertices connected by edges, and computing, for each graph, a plurality of features based on the edges and vertices. The computed features, detailed below, provide a scalar quantity that may then be normalized into a predetermined range, such as 0-1. An application operable on a gragnostics (a portmanteau of "graph" and "diagnostics") processor arranges, for each graph, each of the normalized features into a feature vector having ordered values for each of the features. The example herein coalesces 10 features into an ordered vector of normalized values in the 0.0-1.0 range, providing a multidimensional vector coalescing the features of each graph. The gragnostics processor determines similarity of the graphs based on a distance between the corresponding visualized feature vectors, and a user display renders a visualization of the feature vectors for depicting the relative distance from other graphs.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

The patent or application file contains at least one drawing executed in color. Copies of this patent or patent application publication with color drawing(s) will be provided by the Office upon request and payment of the necessary fee.

FIGS. 5A1-5C denote a flowchart depicting graph processing resulting in the gragnostic plot of FIGS. 4A-4D.

DETAILED DESCRIPTION

Figure 1:
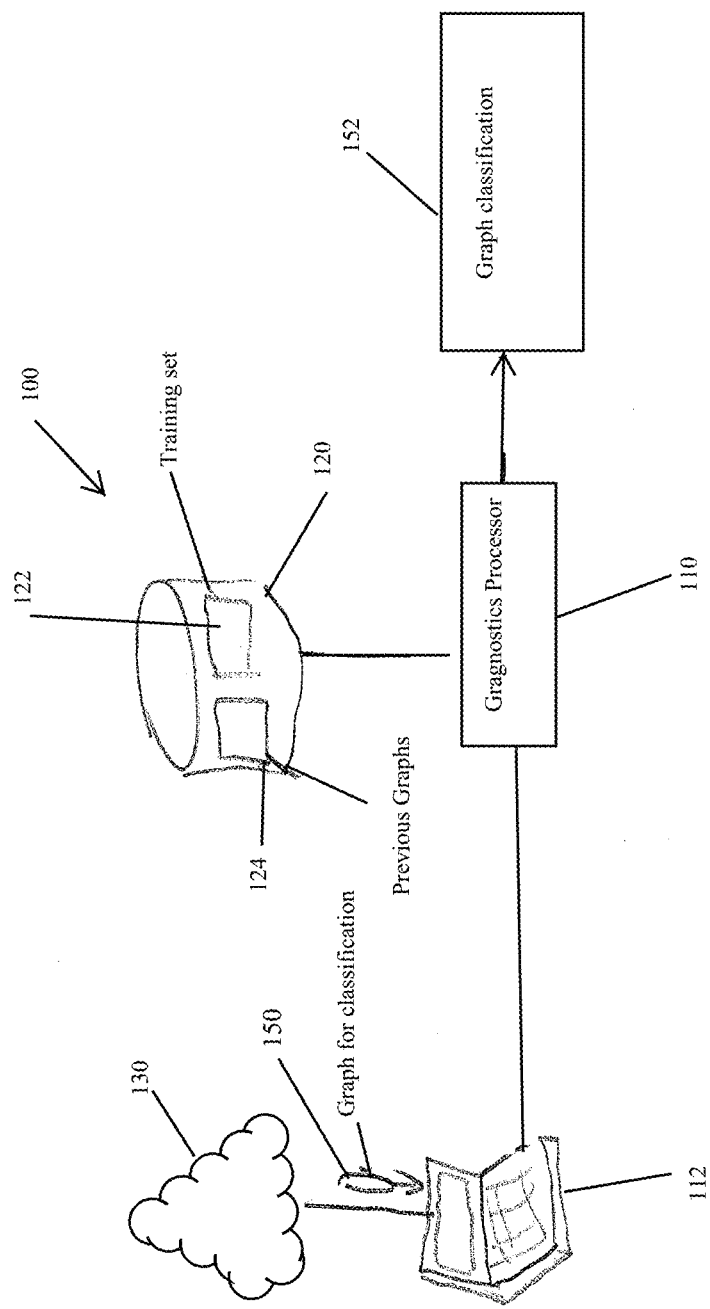
FIG. 1 is a context diagram of a computing environment suitable for use with configurations herein.

Configurations below implement a gragnostic processing approach for an example set of graphs, and illustrate comparison and determination of a graph class based on a baseline or control set of other graphs. An example set of graphs are employed for training and for classification, however any suitable graph representations may be employed. A graph as employed herein is a mathematical structure defining a set of nodes—also known as vertices—and the links—or edges—that connect them. Speed and efficiency are significant because graph comparisons can be used to determine similarity or distances between a large number of graphs, which in turn can then be used to cluster large graph datasets, or to query a database to identify similar graphs. For example, in social media networks, clustering users' ego networks may identify fake accounts vs. real accounts.

The disclosed approach demonstrates several advantages over the prior art: 1) Computational performance that enables highly scalable graph comparisons, 2) comparisons that can be meaningfully interpreted by humans, and 3) fewer constraints on input graphs. Determining similarity of two graphs is related to graph isomorphism, which belongs to the class of NP problems, i.e. computationally intractable in practice. Conventional approaches include so-called Graph kernels which are more computationally tractable by using algorithms whose running time is a polynomial function of the number of nodes in the graph, but these kernels cannot be meaningfully interpreted or understood by humans. Moreover, polynomial time functions become computationally infeasible for very large graphs. In contrast, linear computability metrics are scalable because the complexity (number of computing operations) does not vary exponentially with the number of inputs, which becomes prohibitive with a sufficiently large number of inputs. Other conventional approaches use techniques such as singular value decomposition of adjacency matrices or multi-dimensional scaling on Euclidean distances between adjacency matrices, however these are also polynomial time functions that yield unintelligible results and require that input graphs all be of the same size. Other conventional approaches include Degree Distribution Quantification and Comparison or the Kolmogorov-Smirnov test on degree distributions, which offer an improved running time (feature extraction in $O(|V|)$ time), but the features are only marginally more interpretable and do not offer substantive insight into how the topology differs between two or more graphs.

The gragnostics approach disclosed herein emphasizes several advantages. First, gragnostics should scale to large graphs, thus the disclosed gragnostics can be computed in $O(|V|+|E|)$ time (vertices and edges). Second, the features are comprehensible by analysts who may not be experts in graph theory, as the rendered gragnostics correspond to topological characteristics described in visual renderings. This enables broad audiences to easily understand gragnostics. Third, the disclosed approach imposes few constraints, so there are few restrictions on size or components, which also complements the linear computability provided by $O(|V|+|E|)$.

FIG. 1 is a context diagram of a computing environment 100 suitable for use with configurations herein. Referring to FIG. 1, a gragnostics processor 110 is responsive to a user computing device 112. A repository 120 stores a plurality of graphs, which may include a training set 122 of graphs depicting particular types, or previous graphs 124 employed for classification, which are then added to the set of graphs employed for classification.

Configurations herein are particularly beneficial in an analytics environment having graph data responsive to rendering for visual recognition and comparison. Visually recognizable aspects of the rendered graphs can denote statistical trends defined in a plurality of graphs. The gragnostics processor 110 receives a plurality of graphs, such that each graph defines associations between data entities and is renderable in a visual form having vertices connected by edges. Generally, the graphs are defined by a data structure indicative of, for each vertex, an association to a set of connected vertices, in which each vertex is renderable as a node and the set of associations defined by a line (edge) to each connected vertex. A variety of data structures may be employed for storing the graph representations as utilized herein.

The user device 112 receives a graph for classification 150 from any suitable source, such as the Internet 130 or other source, such as a set of graphs stored on media to be classified according to configurations herein. The classification processor 110, which may simply be a desktop PC in conjunction with the user device 112, performs the classification and renders a graph classification 152 indicative of graphs in the repository 120 that the graph for classification most resembles. As will be discussed further below, similar graphs produce distinct clusters when classified according to a robust set of graphs, therefore defining a distinct group that the graph for classification most resembles. Once processed for classification, the graph may also be stored in the repository 120 as a previous graph 124 and used for subsequent classifications.

Figure 2:
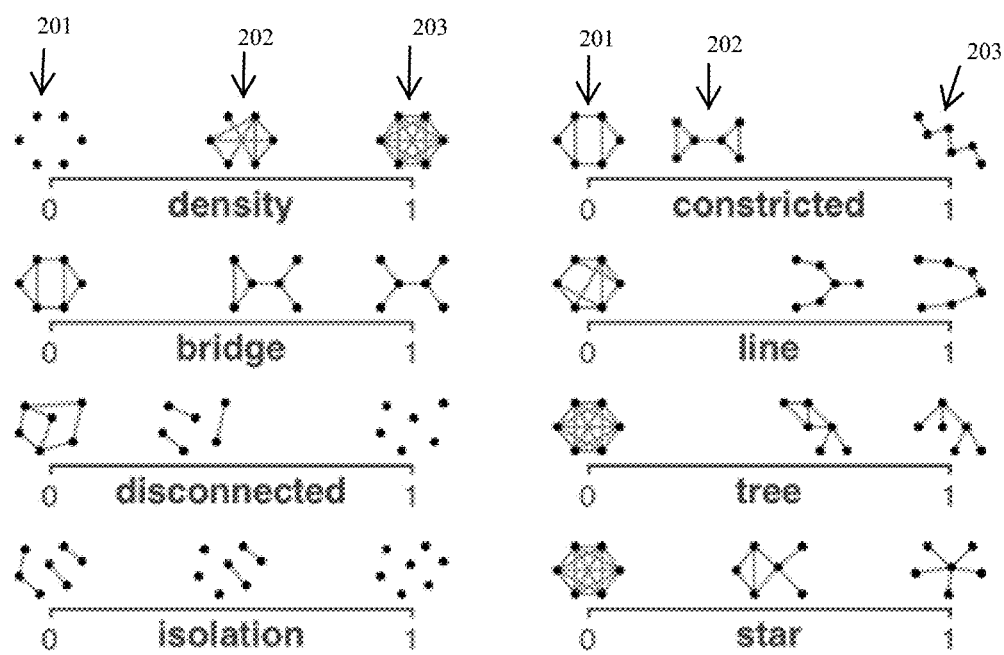
FIG. 2 shows an example of graph features employed in assessing graphs in the computing environment of FIG. 1.

FIG. 2 shows an example of graph features employed in assessing graphs in the computing environment of FIG. 1. Referring to FIGS. 1 and 2, the gragnostics processor 150 computes, for each graph, a plurality of features based on the edges and vertices. Each of the features has a linear computability time such that the feature is computable in a time that varies linearly with the number of nodes and/or vertices, providing for scalability to large accumulations of data. Each feature corresponds to a set of traversal steps for processing the graph, in which the traversal steps define a finite sequence of operations that varies linearly based on the number of vertices or edges in the graph.

The gragnostics processor 150 computes each of the features in a numerical manner, and normalizes each of the features to a range between 0.0 and 1.0 to facilitate intra-graph comparisons. The features relate to visual attributes of the graphs, and include density, bridge, disconnectivity, isolation, constriction, linearity, tree and star, and also the number of vertices (nodes) and a number of edges. FIG. 2 shows a visual appearance of a minimal 201 depiction of a feature ranging to a maximum depiction 203 of a feature, as well as a moderate depiction 202 of the feature. Gragnostics processor 150 normalizes the computed features into a predetermined range, such that for each feature, the value is scaled to a range of between 0 and 1. Alternate feature ranges may be performed, however normalizing to the same range allows comparison between different graphs in the plurality of graphs.

The gragnostics processor 110 employs constant time interpretable metrics to create a graph feature vector that can be used to compute distance between graphs using techniques such as or Euclidean distance or compute clusters of graphs using techniques such as k-nearest neighbors or k-means clustering. Other multidimensional distance approaches may also be employed.

For each graph, the gragnostics processor 110 arranges each of the normalized features into a feature vector having ordered values for each of the features. In the example configuration using 10 features, the feature vector includes a value for each feature normalized to a common range for the 10 features, 0.0-1.0 in this case. A more technical discussion of the linear computation of each of the 10 metrics is disclosed below with respect to FIGS. 4A-4D.

Figure 3:
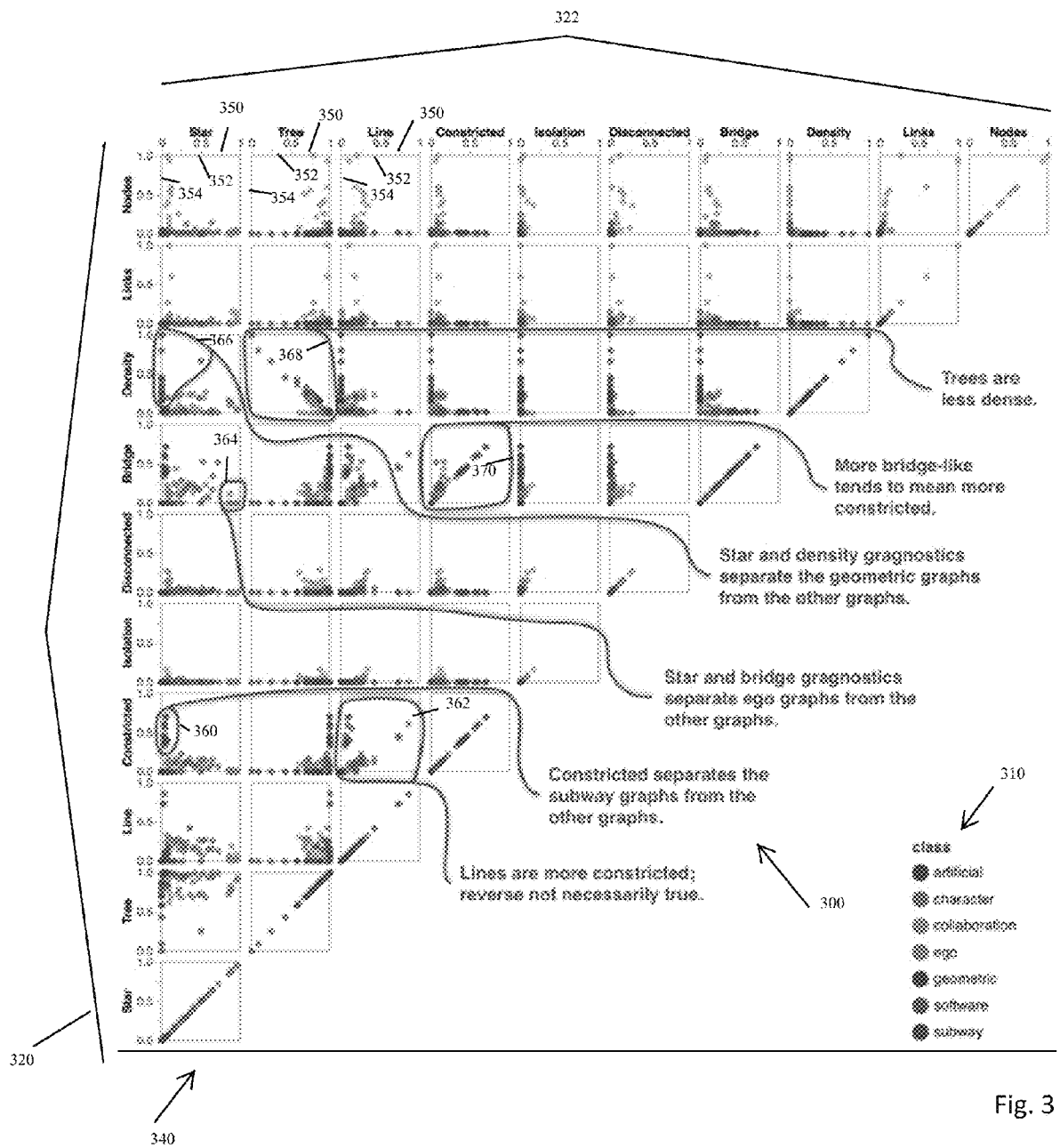
FIG. 3 is an example correlation of the graph features FIG. 2 derived from a set of graphs.

FIG. 3 is an example correlation of the graph features FIG. 2 derived from a set of graphs. Referring to FIGS. 2 and 3, computation of each of the 10 feature metrics results in the intermediate step shown in FIG. 3. A plurality of classes 310 are defined based on at least the training set 122 to produce a correlation 300 of features. The classes 310, each denoted by a different color, define the classifications, or groups of graphs, discussed further below in FIG. 4. FIG. 3 illustrates the degree to which certain features correlate with, or predict, other features. A vertical axis 320 lists each of the 10 features, and a horizontal axis 322 lists the same set of features. The intersection of each feature depicts an array of subgraphs 350 (3 upper left subgraphs labeled for clarity). FIG. 3 also illustrates the benefit of normalizing each of the features to the range of 0.0-1.0 to allow comparison to other features, as each subgraph 350 has a horizontal axis 352 and vertical axis 354. The horizontal axis 352 defines the value of the feature defined on the axis 322, and the vertical axis 354 defines the value of the feature defined on the axis 320. Within each subgraph 350, each graph in a training set 122 is plotted based on the normalized value of the feature. This illustrates the intermediate step of rendering a graphing of each feature against the other features for each graph. The color of the plot point indicates the group from which the graph was derived. Several of the conclusions that may be drawn at this stage are labeled in FIG. 3.

For example, a grouping 360 denotes that subway graphs (green dots showing graphs derived from an inner city subway layout) tend to be less constricted (constricted feature value near 0.0). Group 362 shows that a high value in the lines feature tends to correlate with the constriction feature. Group 364 demonstrates that star and bridge features distinguish the ego graphs (pink dots showing social media connections). Similarly, group 366 distinguishes geometric graphs (blue dots derived from graphs of regular geometric shapes). Group 368 demonstrates a correlation between tree and density features, and group 370 shows correlation between bridge and constricted features. Other conclusions regarding classification will be discussed below with respect to FIG. 4. Not surprisingly, the plots of the same feature along the correlation 340 each define a diagonal line (e.g. star to star, etc.).

While the graphical depictions of FIG. 3 can define relations between certain graphs, FIGS. 4A-4D coalesce the aggregate features of each graph for comparison on a broader scale. FIGS. 4A-4D show a gragnostic plot for comparing feature vectors aggregated from the graph features of FIG. 3. Referring to FIGS. 2 and 4, the computed set of features (10, in the example shown) defines an ordered vector, which can be represented in a multidimensional space. FIGS. 4A-4D build on the feature vector generated from the metrics of FIG. 3 by computing a two dimensional (2D) plot depicting each of the feature vectors presented for comparison. In a particular example, the preexisting graphs of the training set 122 and previous graphs 124 are already plotted to define graph types, one of which the graphs for classification 150 will fall into.

The feature vector includes the ten 0.0-1.0 magnitudes of each of the normalized features for each graph. The user device 112 is operable for rendering a visualization of the feature vectors, and the gragnostics processor 110 determines a similarity of the graphs based on a distance between the corresponding visualized feature vectors. It should be noted that the visual rendering of FIG. 3, depicting individual features, is an intermediate step not required for generating the feature vector. The feature vector is generated from the 10 computed, normalized features. The feature vector, when computed as on ordered set of normalized values, therefore defines a multidimensional vector, or a reference to a multidimensional space. The gragnostics processor 110 is configured to compute a multidimensional distance between each of the feature vectors for determining a similarity between the graphs corresponding to the feature vectors. A multidimensional distance is computable between vectors of different graphs, offering a coalesced metric of similarity to other graphs. Also, the feature vector may be projected or reduced onto a two-dimensional (2D) plane depicting the computed distance between the feature vectors of different graphs. Similar graphs appear as a "cluster" or closely located set of points, as depicted in FIGS. 4A-4D. Graphs classification occurs based on the computed distance between the feature vectors of each of the graphs, and rendered visually by these clusters of points.

Figure 4A:
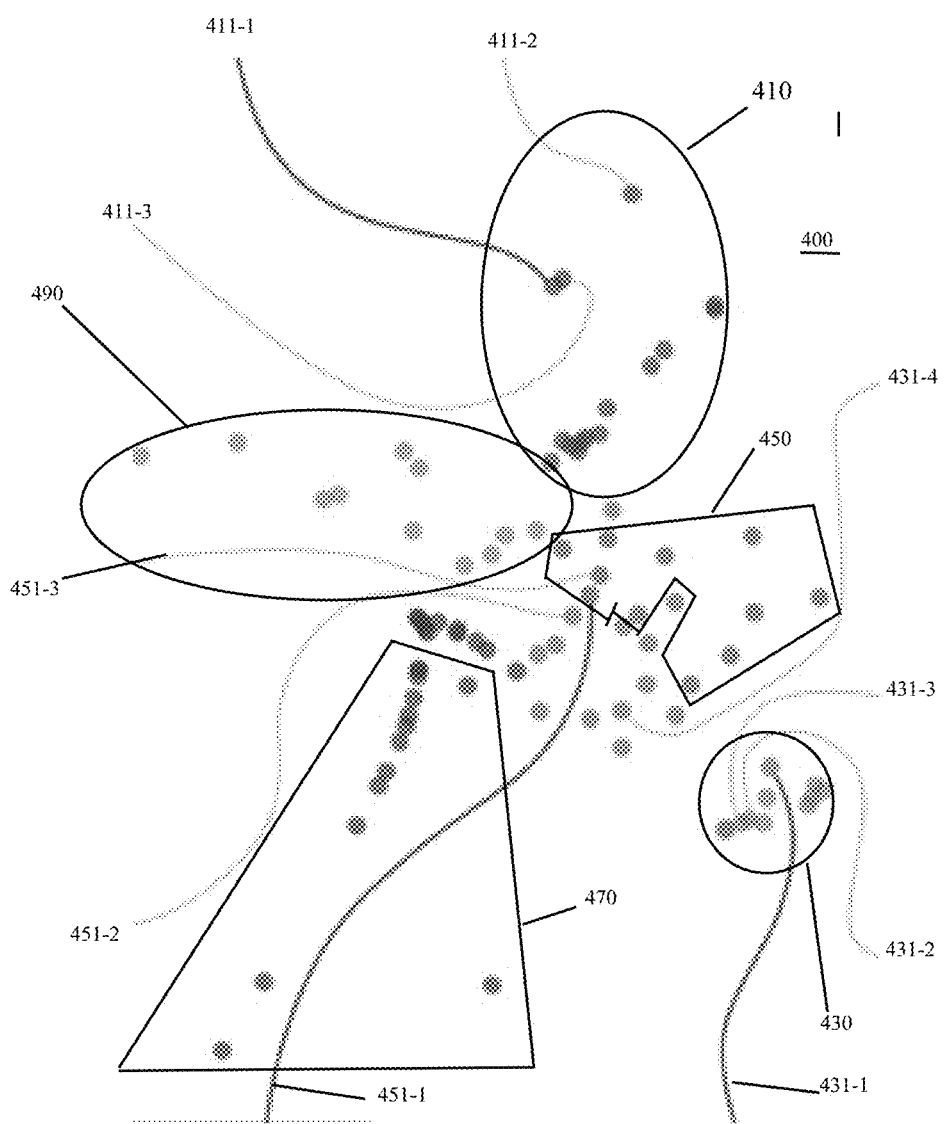
FIGS. 4A-4D show a gragnostic plot for comparing feature vectors aggregated from the graph features of FIG. 3.
Figure 4B:
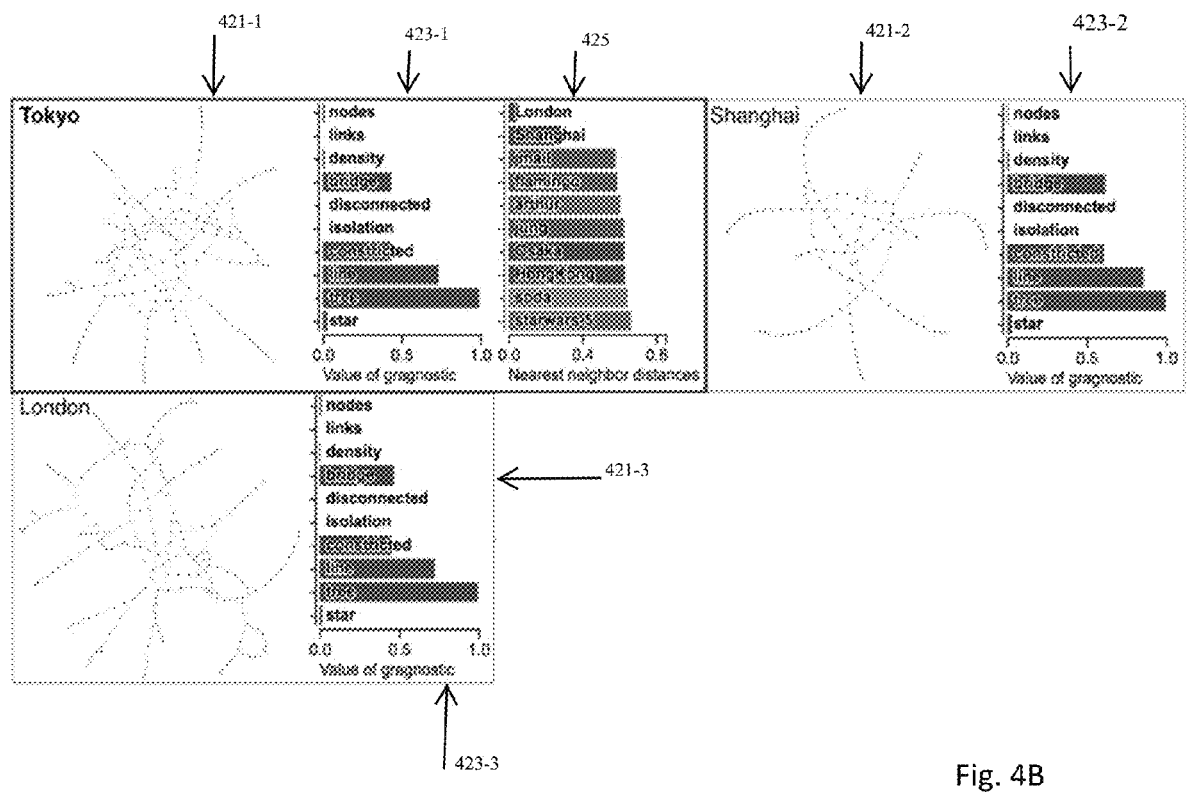
Figure 4C:
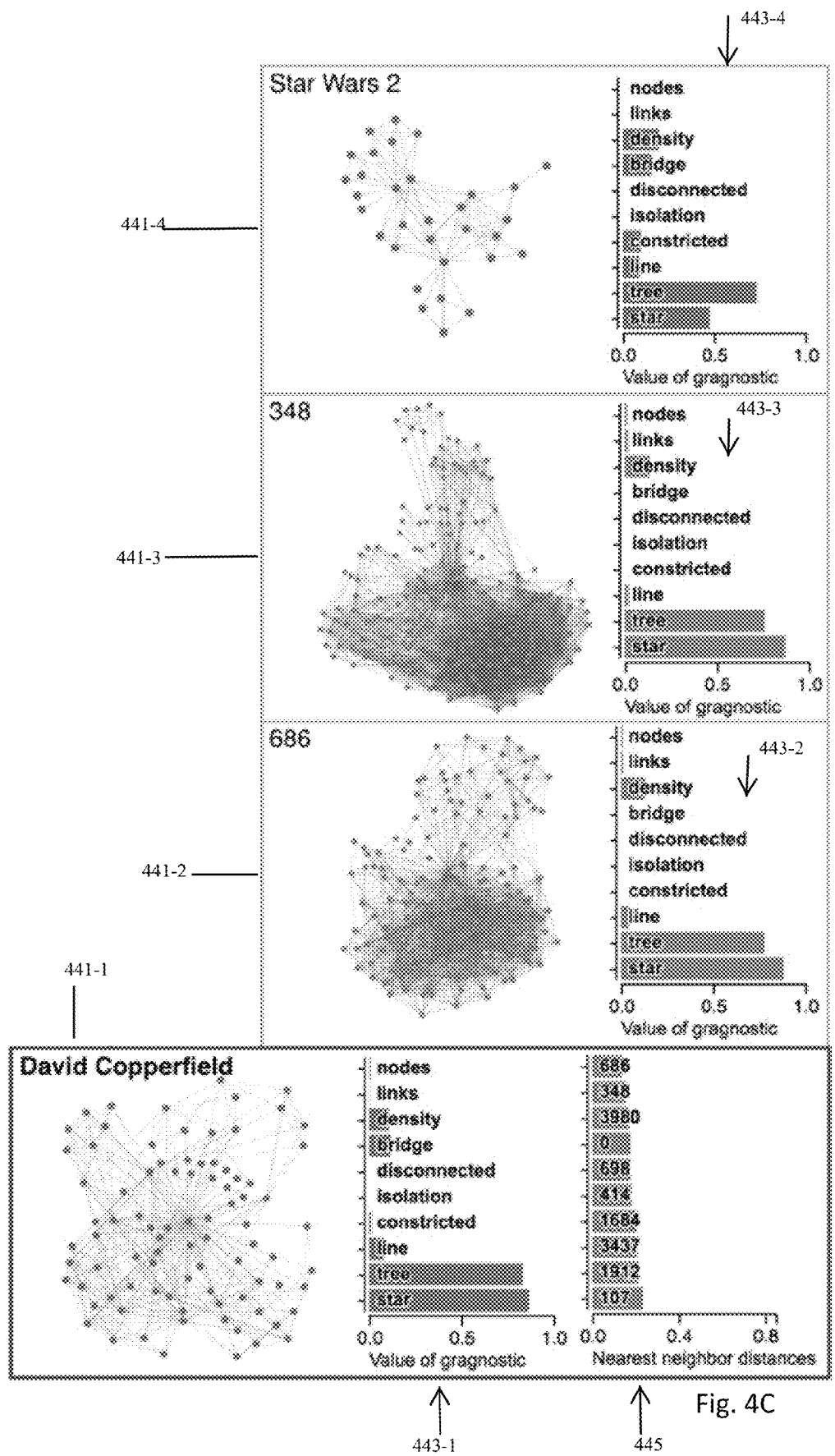

The graph rendering of FIG. 4A depicts a comparison of the computed distance between each of the graphs, and classification of each of the graphs based on the comparison by determining a nearest neighbor, shown as different colors in FIG. 4A. Referring to FIGS. 4A-4D, distinct groups of values (points) are shown for a sample set of graphs. A two dimensional rendering region 400 depicts a metric multi-dimensional scaling (MDS) plot of graphs projected onto 2 dimensions from the 10-dimensional gragnostics feature space (e.g a multidimensional space encompassing the 10 value feature vector). In general, FIG. 4A illustrates notable class separation in groups 410, 430, 450, 470 and 490, indicating that different classes of graphs have different feature vector values. A cluster 410 of green plots are based on graphs of subway maps. Graph plots 411-1, 411-2 and 411-3 are based on graph data of graphs 421-1, 421-2 and 421-3, respectively, depicting the Tokyo, Shanghai and London subway networks. In this example, Tokyo 421-1 represents the graphs for classification and graphs 421-2 and 421-3 are the computed nearest neighbors in the training set. Feature vector 423-1 shows the values of the features computed for the graph 421-1, and feature vectors 423-2 and 423-3 shows the respective training set values. It is apparent that the tree feature value is just short of 1.0 for each graph, and the line feature is the next highest value at around 0.75. Comparable values for constricted and bridge features exist also. A nearest neighbors value 425 shows London and Shanghai as the closest valued vectors, a characteristic visually apparent on the rendering region 400. It is apparent that, based on the classification of the Tokyo subway graph 421-1, its distance to the London subway graph 421-3 is very short; its features are nearly identical, and its force-directed node-link diagram shares the same visual structure. Meanwhile, the Tokyo graph's second nearest neighbor is the Shanghai subway graph 421-2, which is farther away than London. Shanghai has higher bridge, constricted, and line features. Furthermore, we can visually confirm this dissimilarity by looking at Shanghai's force-directed node-link diagram and noting that it has more bridge edges, it is more constricted, and it is more line-like because more vertices have only two edges A similar analysis follows for a cluster 430 (pink) depicting ego networks, as derived from FACEBOOK® connections. Referring to FIGS. 4A and 4C, it is interesting to note that the David Copperfield graph's (431-1) nearest neighbors are all Facebook ego networks. This classification makes sense if we consider that David Copperfield is often considered to be a semi-autobiographical novel about Charles Dickens, in essence making it an ego graph of the central character. Examining the respective graphs 441-1, 441-2, 441-3 and 441-4 based on plots 431-1, 431-2, 431-3 and 431-4, the feature vectors 443-1, 443-2 and 443-3 indicate that the star feature is most pronounced, followed by the tree feature value. The nearest neighbor values 445 likewise designate "686" and "348" as the closest. For comparison, one of the nearest character graphs (turquoise) is Star Wars 2 (441-4) having feature vector 443-4. The Star Wars 2 and Storm of Swords graphs (FIG. 4D) are more typical of non-autobiographical character graphs. We also see that the software and the character classes overlap in the MDS plot 400.

Figure 4D:
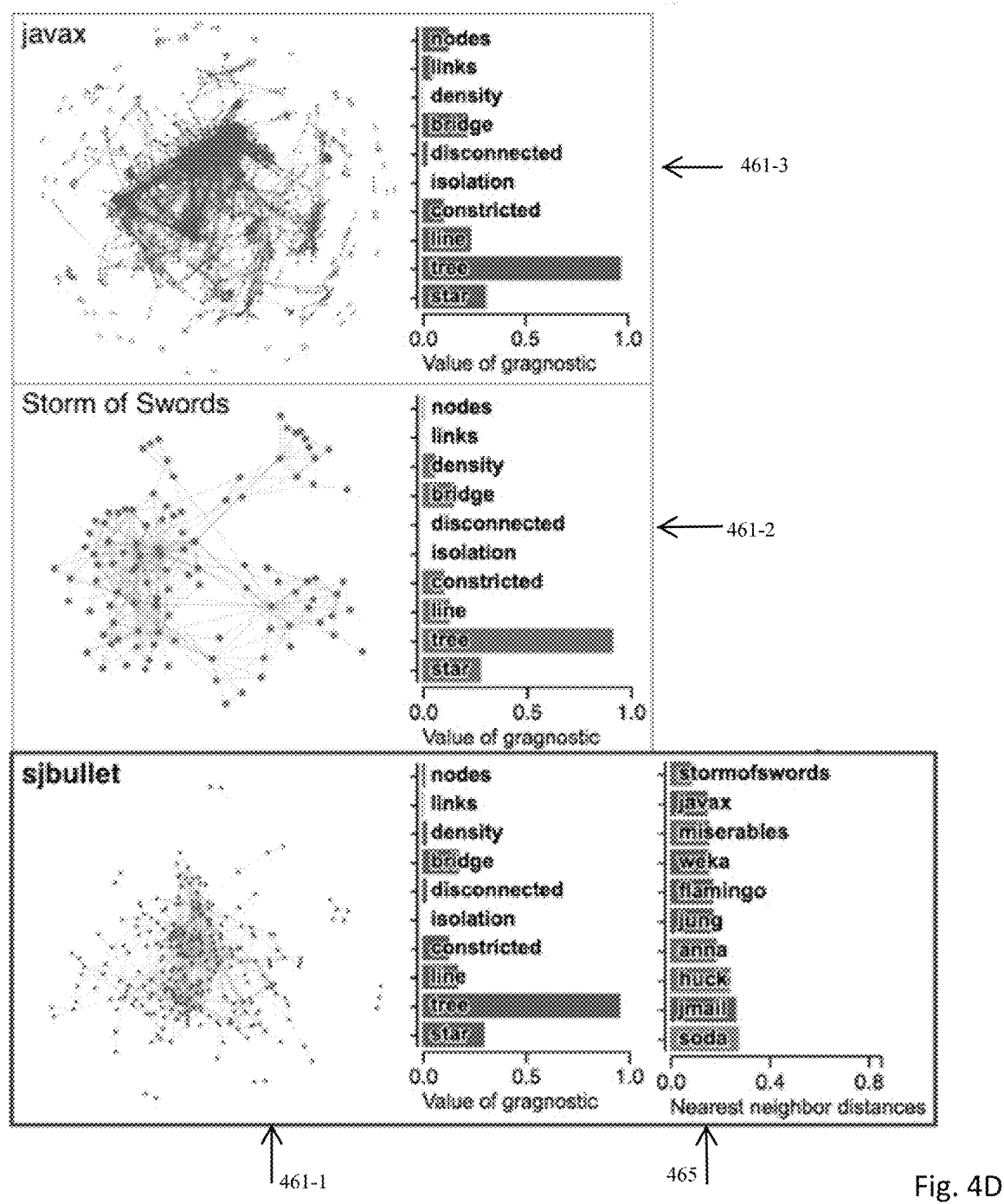

Another grouping 450 is based on software graphs, defined by code structure and plotted as color purple. A plot for classification 451-1 is shown in FIG. 4D as graph 461-1 (sjbullet), with nearest neighbors of 451-2 and 451-3, corresponding to graphs 461-2 (Storm of Swords) and Javax 461-3. Based on the sjbullet software graph 461-1, it can be seen that its features are similar to the Storm of Swords character graph 461-2, illustrating overlap, although it is a littler smaller and a little less dense. The next nearest neighbor is Javax 461-3, shown by nearest neighbor values 465, and each has highest feature values of tree, with the star feature running a distant second.

Computation of the feature vector, in the disclosed configuration, includes computation of each of the following 10 features in linear computability time, meaning that the number of computing instructions, and hence time, varies linearly with the number of nodes and/or vertices.

Number of nodes: This counts the number of nodes in the graph. This runs in $O(|V|)$ time.

Number of links: This counts the number of links in the graph. This runs in $O(|E|)$ time.

Density. This determines the link density in the graph, or the probability that any two randomly chosen nodes will be connected via a link. This is calculated by:

$$\frac{2 \cdot |E|}{|V| \cdot (|V| - 1)}$$

If $|V|$ and $|E|$ are already calculated, then this runs in $O(1)$ time; otherwise it runs in $O(|V|+|E|)$ time.

Isolation. This describes the fraction of nodes in the graph that are not connected to any other node. This is calculated by:

$$\frac{|\{v \in V : d(v) = 0\}|}{|V|}$$

Where $d(v)$ is the degree of node v. This requires counting the number of nodes that have degree 0, so this runs in $O(|V|+|E|)$ time.

Star. This describes the degree to which a single node is more central than the other nodes in a graph. This is calculated by:

$$\sum_{v \in V} \frac{d(v^*) - d(v)}{(|V| - 1)(|V| - 2)}$$

Where v* represents the node with the highest degree in the graph. This requires finding the node with the highest degree and summing the degree of each node, so this runs in $O(|V|+|E|)$ time.

Bridge. This describes the fraction of links in the graph whose removal will disconnect the graph. This is calculated by:

$$\frac{\text{bridge}(G)}{|V| - 1}$$

Where bridge(G) is the number of bridge links in graph G. Using a breadth-first search, all bridges can be found in $O(|V|+|E|)$ time.

Constricted. This describes the fraction of nodes in the graph whose removal will disconnect the graph. This is calculated by:

$$\frac{\text{cut}(G)}{|V| - 2}$$

Where cut(G) is the number of nodes whose removal will disconnect the graph. This can also be breadth found using a breadth-first search in $O(|V|+|E|)$ time.

Disconnected: This describes the fraction of connected components in a graph out of the maximum possible number of connected components, i.e. a fraction denoting the degree that clusters are unreachable by other clusters.

$$\frac{|C| - 1}{|V| - 1}$$

Where $|C|$ is the number of connected components in the graph, which can be found in $O(|V|+|E|)$ time.

Tree: This describes how close a graph is to being a tree, i.e. how close it is to a graph with no cycles. This is calculated by:

$$1 - \frac{|E| - (|V| - 1)}{|V| \cdot (|V| - 1)/2 - (|V| - 1)}$$

Colloquially, this refers to the number of links needed to be removed in order to make the graph a tree, divided by the maximum possible number of links needed to remove to make the graph a tree, all subtracted from 1. If $|V|$ and $|E|$ are already calculated, then this runs in $O(1)$ time; otherwise it runs in $O(|V|+|E|)$ time.

Line: This calculates how close a graph is to being a line, i.e. a tree with exactly two leaves where there is only one path from one leaf to the other. This is calculated by:

$$\sum_{i=1}^{|V|} \frac{l(i)}{|V|}$$

Where $$l(i) = \begin{cases} 1, & \text{if } \overline{D}_i = 1 \text{ and } i \leq 2, \text{ or if } \overline{D}_i = 2 \text{ and } i > 2 \\ 0, & \text{otherwise.} \end{cases}$$

Here, D is a vector of length $|V|$ where each element is the degree $d(v)$ of a vertex in V such that if $d(v)=1$ then it is at the beginning of the vector. This requires iterating over each edge to calculate the degree of each vertex, and then iterating over each vertex to twice to ensure that if $d(v)=1$ then it is at the front of the list, so this runs in $O(|V|+|E|)$ time.

FIGS. 5A1-5C denote a flowchart 500 depicting graph processing resulting in the gragnostic plot of FIGS. 4A-4D. Referring to FIGS. 1, 5A1 and 5A2, at step 501, the gragnostics processor 110 loads each graph from a media source or user data store. As indicated previously, a classification is performed for one graph against a preexisting training set 122 or previous graphs 124 presented for classification. In practice, the following gragnostics steps are performed for all graphs, and a classification distinction made against previously processed graphs. This includes receiving a plurality of graphs in a suitable data structure, such that each graph defines associations between data entities and is renderable in a visual form having vertices connected by edges, as depicted at step 502.

The gragnostics processor 110 preprocesses each graph to arrange for feature computation, as disclosed at step 503. Each of the graphs is defined by a data structure indicative of, for each vertex, an association to a set of connected vertices, such that each vertex is renderable as a node and the set of associations defined by a line to each connected vertex, as depicted at step 504. Such an arrangement corresponds to a typical visualization of a graph which has the appearance of circles with lines emanating from each circle and terminating in other circles to which the lines connect.

The gragnostics processor 110 extracts the 10 features, as shown at step 505. The set of 10 features provides an illustrative set for permitting optimal computation of the graphs as defined herein, however similar configurations may consider a greater or lesser number of features. The gragnostics processor 110 computes, for each graph, a plurality of features based on the edges and vertices, as depicted at step 506. In the example configuration, each of the features has a linear computability time such that the feature is computable in a time that varies linearly with at least one of the number of nodes or vertices, as depicted at step 507

Figure 5B:
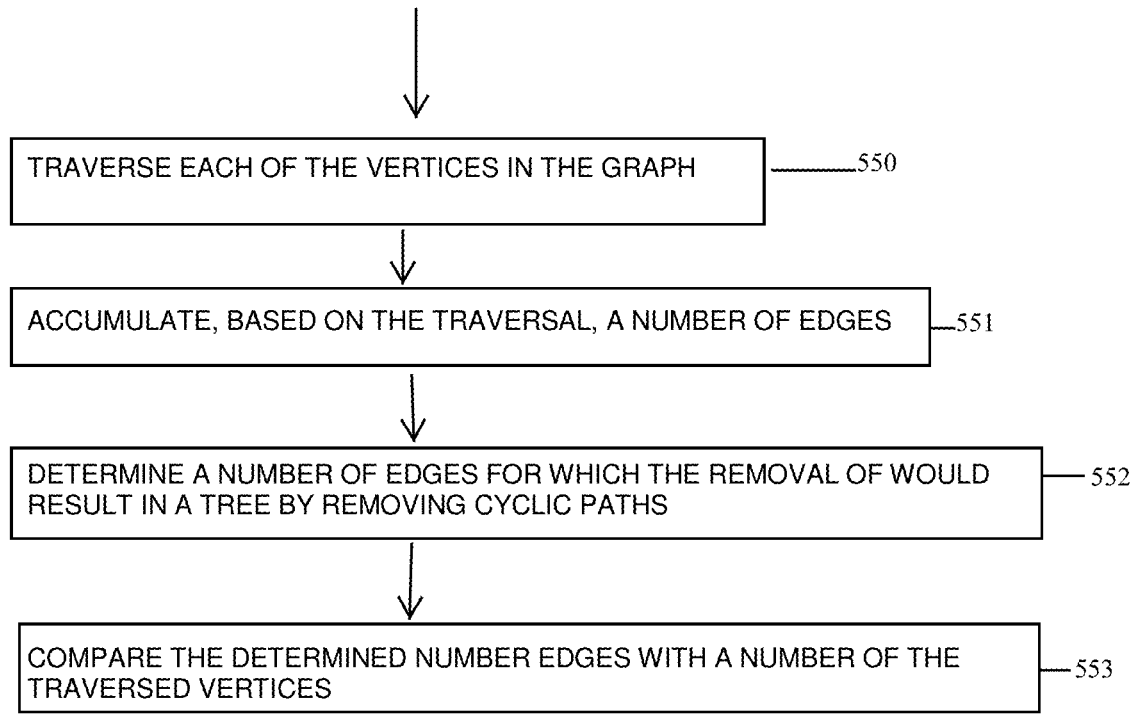
Figure 5C:
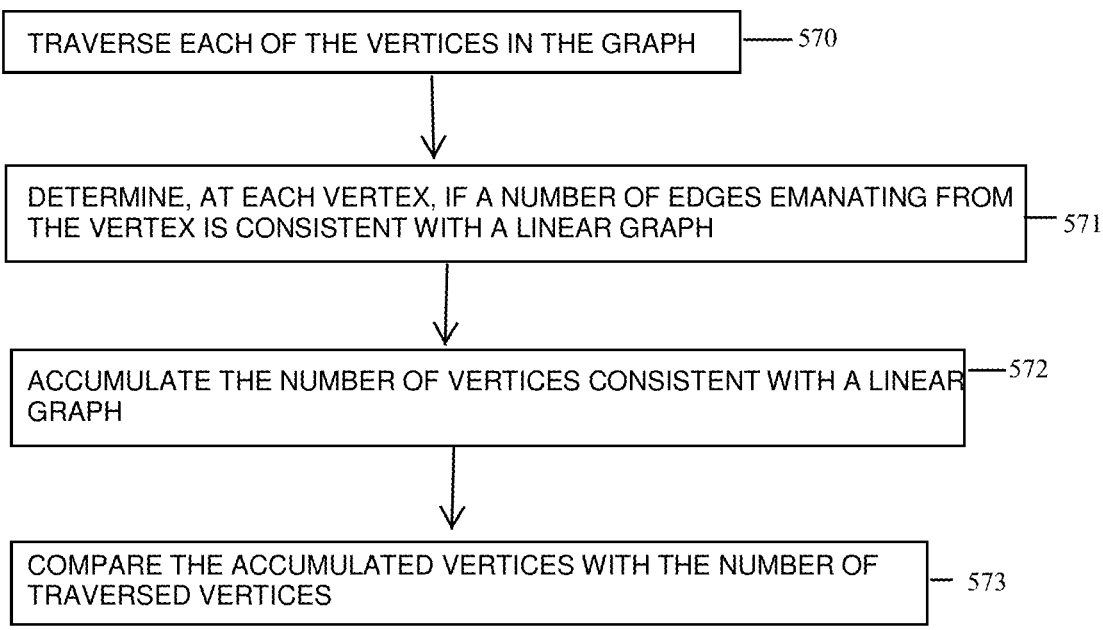

In particular, the gragnostics processor computes the tree feature at step 508, depicted in FIG. 5B, and the linearity feature at step 509, depicted in FIG. 5C.

From the computed features, the gragnostics processor 110 creates a feature vector using the 10 features for each graph, as disclosed at step 510. This includes, at step 511, normalizing the computed features into a predetermined range, and for each graph, arranging each of the normalized features into a feature vector, such that the feature vector has ordered values for each of the features, depicted at step 512. Normalizing, in the example configuration, scales each feature to a range of 0.0-1.0, facilitating comparison and rendering as a multidimensional vector.

Comparison and visualization incudes computing distances between graphs using the feature vectors, as shown at step 512. Multidimensional values such as the feature vector may be compared using Euclidian distance or similar metrics, such that the distance between feature vectors is indicative of the similarity of the corresponding graphs. The gragnostics processor 110 computes a two dimensional position based on each of the feature vectors, as depicted at step 514, and projects the position of each vector onto a visualized two dimensional rendering, as depicted at step 515 and rendered in FIG. 4A.

The gragnostics processor 110 launches the desired comparison analytic (e.g. clustering or nearest neighbor search), and invokes the interpretability of the features to understand differences between graphs and clusters of graphs (e.g. these two graphs are very similar, except one is more star-like than the other), as disclosed at step 516. Groupings, or classifications of graphs, can therefore be determined by observing a cluster of graphs separated by relatively small distances. The gragnostics processor 110 classifies, based on a distance on the visualized two dimensional graph, groups of graphs, such that the classification is defined by visual clusters of the positions on the two dimensional rendering, as depicted at step 517. The result is a determination of whether the graph for classification corresponds to one of the classes of graphs, disclosed at step 518.

FIG. 5B is a flowchart of computation of the tree feature. Referring to FIG. 5B, computing the features includes, at step 550, and determining the tree feature in linear time by traversing each of the vertices in the graph and accumulating, based on the traversal, a number of edges, as depicted at step 551. The gragnostics processor 110 determines a number of edges for which the removal of would result in a tree by removing cyclic paths, as disclosed at step 552, thus providing a measure of how "close" the graph is to a model tree, and compares the determined number of edges with a number of the traversed vertices, as disclosed at step 553.

FIG. 5C details computation of the linearity feature. Referring to FIG. 5C, computing the linearity feature in linear time includes traversing each of the vertices in the graph, as shown at step 570, and determining, at each vertex, if a number of edges emanating from the vertex is consistent with a linear graph, as depicted at step 571. The gragnostics processor 110 accumulates the number of vertices consistent with a linear graph, at step 572, and compares the accumulated vertices with the number of traversed vertices, as depicted at step 573. The result is a measure of a relative number of total vertices that satisfy the criteria for a linear graph, meaning two edges touch each vertex with the exception of two terminal vertices touching only one edge.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In an analytics environment having graph data responsive to rendering for visual recognition and comparison of statistical trends defined in a plurality of graphs, a scalable method of rendering graph data, comprising:
   receiving a plurality of graphs, each graph of the plurality of graphs defining associations between data entities and renderable in a visual form having a plurality of vertices connected by one or more edges;
   computing, for each graph, a plurality of features based on the edges and vertices interconnected by the edges, by computing a feature value for each of the features in a linear computability time based on a number of edges or a number of vertices of each respective graph of the plurality of graphs independently of reference to any other graphs of the plurality of graphs;

normalizing the computed feature values into a predetermined range;

for each graph, arranging each of the normalized feature values into a feature vector, the feature vector ordering the feature values for each of the features, the ordered feature values in the feature vector including a tree feature computed in linear time by:

traversing each of the vertices in the graph;

accumulating, based on the traversal, a number of edges; and determining a number of edges for which the removal of would result in a tree by removing cyclic paths; and comparing the determined number of edges with a number of the traversed vertices;

computing a multidimensional distance between each of the feature vectors for determining a similarity between the graphs corresponding to the feature vectors;

computing a two dimensional position corresponding to each of the feature vectors based on a projection of the computed multidimensional distance; and rendering a two dimensional visualization of the feature vectors by displaying the computed two-dimensional position of each feature vector, the two-dimensional visualization depicting clusters of closely located sets of points, each point in the set of points defining a projection of a multidimensional value defined by the corresponding graph and feature vector.

2. The method of claim 1 further comprising determining a similarity of the graphs based on a distance between the corresponding visualized feature vectors by classifying, based on a distance depicted on the visualized two dimensional rendering, groups of graphs, the classification defined by visual clusters of the position computed for each feature vector on the two dimensional rendering.

3. The method of claim 1 wherein the graphs are defined by a data structure indicative of, for each vertex, an association to a set of connected vertices, each vertex renderable as a node and the set of associations defined by an edge depicted as a line to each connected vertex.

4. The method of claim 1 further comprising classifying the graphs based on the computed multidimensional distance between the feature vectors corresponding to each of the graphs.

5. The method of claim 1 further comprising:
comparing the computed multidimensional distance between each of the graphs, and
classifying each of the graphs based on the comparison by determining a nearest neighbor.

6. The method of claim 1 further comprising:
computing the feature vectors for a set of training graphs, the training graphs defining at least one class of graphs;
receiving a graph for classification;
computing the feature vector corresponding to the graph for classification; and
determining if the graph for classification corresponds to one of the classes of graphs.

7. The method of claim 1 wherein the feature vector includes a value for each of at least 10 features including a number of vertices, a number of edges, density, bridge, disconnectivity, isolation, constriction, linearity, tree and star, each value scaled to a range of 0 to 1.

8. The method of claim 1 wherein each feature corresponds to a set of traversal steps, the traversal steps defining a finite sequence of operations that varies linearly based on the number of vertices or edges in the graph.

9. The method of claim 1 further comprising computing the feature vector of each graph of the plurality of graphs without reference to a feature vector based on other graphs of the plurality of graphs.

10. In an analytics environment having graph data responsive to rendering for visual recognition and comparison of statistical trends defined in a plurality of graphs, a scalable method of rendering graph data, comprising:

receiving a plurality of graphs, each graph of the plurality of graphs defining associations between data entities and renderable in a visual form having a plurality of vertices connected by one or more edges;

computing, for each graph, a plurality of features based on the edges and vertices interconnected by the edges, by computing a feature value for each of the features in a linear computability time based on a number of edges or a number of vertices of each respective graph of the plurality of graphs independently of reference to any other graphs of the plurality of graphs;

normalizing the computed feature values into a predetermined range;

for each graph, arranging each of the normalized feature values into a feature vector, the feature vector ordering the feature values for each of the features, the ordered feature values in the feature vector including a linearity feature computed in linear time by:

traversing each of the vertices in the graph;

determining, at each vertex, if a number of edges emanating from the vertex is consistent with a linear graph;

accumulating the number of vertices consistent with a linear graph; and comparing the accumulated vertices with the number of traversed vertices;

computing a multidimensional distance between each of the feature vectors for determining a similarity between the graphs corresponding to the feature vectors;

computing a two dimensional position corresponding to each of the feature vectors based on a projection of the computed multidimensional distance; and rendering a two dimensional visualization of the feature vectors by displaying the computed two-dimensional position of each feature vector, the two-dimensional visualization depicting clusters of closely located sets of points, each point in the set of points defining a projection of a multidimensional value defined by the corresponding graph and feature vector.

* * * * *